Patented Oct. 24, 1950

2,526,638

UNITED STATES PATENT OFFICE 2,526,638

PAPER TREATED WITH FORMALDEHYDE AND A POLYMERIC POLYAMINE

Martin E. Cupery, Wilmington, Del., assignor to E. I. du Pont de Nemours & Company, Wilmington, Del., a corporation of Delaware No Drawing. Application March 3, 1949, Serial No. 79,523

5 Claims. (Cl. 260—17.3)

This invention relates to the treatment of paper and to coated or impregnated papers. More particularly this invention relates to improved water-repellent papers and to methods for their preparation.

Although much thought and effort has been expended toward the production of water-proof papers, no entirely satisfactory solution to this important technical problem has heretofore been found.

It is an object of this invention to provide new coated or impregnated papers and methods for their preparation. Another object is to provide paper which is water-repellent. A further object is to provide paper which has greatly improved strength. A still further object is to improve the wet strength of paper. Still another object is to provide paper which is highly sized without sacrificing other desirable properties of the paper. Other objects will appear hereinafter.

These objects are accomplished by providing paper treated with a solution comprising formaldehyde and a polymeric polyamine having a main polymer chain consisting solely of carbon atoms and containing a plurality of amino groups, said polymeric polyamine being selected from the class of polymeric polyamines in which the amino nitrogen has at least one hydrogen atom and is directly attached by a single bond to a carbon atom of the main polymer chain and polymeric polyamines containing primary amino nitrogen atoms linked to a carbon atom of the main polymer chain through a methylene ($CH_2$) group. In one embodiment of this invention, the paper is treated with a solution comprising formaldehyde and a polymeric polyamine which is the product obtained by the reductive amination of monoolefin/carbon monoxide polymers, said polymeric polyamine having a main polymer chain consisting solely of carbon atoms and containing as lateral substituents a plurality of primary amino groups attached directly to a carbon atom of the main polymer chain. In another embodiment of this invention, the paper is treated with a solution comprising formaldehyde and a polymeric polyamine obtained by the reduction of a linear polymer containing units selected from the group consisting of acrylonitrile and alpha-alkacrylonitrile units, said polymeric polyamine having a main polymer chain consisting solely of carbon atoms with the primary amino groups attached to said main polymer chain through methylene ($CH_2$) groups which are lateral substituents thereon. Paper impregnated with formaldehyde and the specified polymeric polyamines is cured by heat-treatment or by drying and aging at room temperature, whereupon the polymeric polyamine becomes insolubilized. Paper so treated possesses very superior properties.

The solutions used in preparing the papers of this invention are made by dissolving the polymeric polyamine in an organic solvent or in an aqueous solution of an organic or inorganic acid in amount sufficient to provide from 0.1 to 15% of the polyamine by weight. To this solution there is then added formaldehyde in amount such as to provide at least one half mole per amino group in the polymeric polyamine. Paper is impregnated with this solution, excess solution is drained or pressed out, and the treated paper is then cured by heat-treatment for from 5 to 45 minutes at 90° to 150° C. or by drying and aging at room temperature for a day or more.

The examples which follow are submitted to illustrate and not to limit this invention. Proportions are expressed in parts by weight, unless otherwise stated.

*Example I*

Polyamines obtained by the reductive amination of polyketones prepared by the copolymerization of ethylene and carbon monoxide were dissolved in 1.5% acetic acid to give solutions containing 10% polyamine by weight. Twenty parts of polyamine solution were mixed with 1 part of 37% formaldehyde solution and the resulting mixtures were applied to one side of kraft paper. After drying, the treated paper was baked 1 hour at 105° C. The paper so treated was highly waterproofed. Drops of water placed on the treated side showed a high contact angle and evaporated without penetrating the paper. Water on the untreated paper had a low contact angle and soaked into the sheet.

The treated side of these sheets was exposed to water for 30 minutes, after which the wet strength was measured by the Elmendorf tear test with the following results:

| Polyamine | Neutralization Equivalent | Parent Ketone | | Tearing Resistance, grams |
|---|---|---|---|---|
| | | Mol. Wt. | E/CO Ratio [1] | |
| A | 505 | 1,780 | 9.6/1 | 136 |
| B | 516 | 1,140 | 11.5/1 | 136 |
| C | 505 | 1,140 | 8.7/1 | 112 |
| D | 368 | 1,430 | 7.8/1 | 136 |
| E | 504 | 1,550 | 6.3/1 | 152 |
| F | 407 | 1,510 | 7/1 | 184 |
| G | 553 | 1,650 | 11/1 | 136 |

[1] Ethylene: carbon monoxide ratio.

In the same test, untreated paper had a tearing resistance of 55 g.

By weighing treated paper while still wet, it was found that the paper absorbed polyamine solution amounting to about 60% of its dry weight. Consequently, in the tests above the concentration of polyamine on the weight of the dry paper was about 5.7%.

Example II

The polyamine solutions modified with formaldehyde in Example I were diluted to a calculated polyamine concentration of 0.4%. This solution was applied to kraft paper to give a polyamine pickup of about 0.23%, based on dry weight of the paper. The treated sheets, after drying, were baked for 30 minutes at 120° C. The treated surface was found to be water-repellent. Samples were soaked in water for 15 minutes and wet strength was measured, as before, by the Elmendorf tear test with the following results:

| Polyamine | Tearing Resistance, Grams |
|---|---|
| A | 40 |
| B | 32 |
| C | 48 |
| D | 40 |
| E | 48 |
| F | 48 |
| G | 40 |

Under the same conditions untreated paper had a tearing strength of 32 grams.

Example III

The waterproofing action of polyamines modified with formaldehyde was compared with that of a conventional sizing agent and with that of a urea-formaldehyde resin used commercially for the treatment of paper. Absorbent blotting paper was impregnated with aqueous solutions of polyamine acetate containing formaldehyde to the extent of 20% of the weight of the polyamine. The polyamine concentration of the solution was 0.5%. The loading of polyamine in each case was 0.5% on the dry weight of the paper. In a similar manner blotting paper was impregnated with 0.5% of its weight, on a solids basis, of a rosin size or of a urea-formaldehyde resin used commercially for the treatment of paper. After curing, the treated sheets were exposed to water on one side only for five minutes and water absorption was determined by measuring the weight gain of a sample having an area of 15 square inches. The following results were obtained.

| Treatment | Method of Curing | Grams of Water Absorbed in 5 Minutes by 15 sq. in. Sample |
|---|---|---|
| 0.5% Urea-Formaldehyde Resin | Air dried 5 days | 5.47 |
| Do | 45 min. at 120° C | 5.68 |
| 0.5% Rosin size | 15 min. at 105° C | 0.37 |
| 0.5% Polyamine F of Example I | Air dried 5 days | 0.31 |
| 0.5% Polyamine G' | do | 0.27 |
| 0.5% Polyamine H | do | 0.28 |
| 0.5% Polyamine I | do | 0.30 |

The properties of the last three polyamines used above are:

| Polyamine | Neutralization Equivalent | Parent Polyketone | |
|---|---|---|---|
| | | Mol. Wt. | E/CO Ratio |
| G' | 579 | 1780 | 9.6/1 |
| H | 549 | 1490 | 10.4/1 |
| I | 506 | 1490 | 10.4/1 |

Thus it will be seen that the polyamine-formaldehyde treatment has a pronounced waterproofing action even on blotting paper and is superior to rosin size used commercially for waterproofing paper. On the other hand, a conventional resin used for improving wet-strength has no waterproofing action on the sheet. It will be seen also that the polyamine-formaldehyde treatment will cure satisfactorily at room temperature.

Example IV

Papers treated as described in Example III were tested for their performance as writing paper for ink. All of the samples treated with polyamine and formaldehyde could be used without running, spreading or "feathering" of the ink. The sample treated with the rosin size showed slight feathering, while that treated with the urea-formaldehyde resin showed very bad feathering of the ink. Thus, the polyamine-formaldehyde treatment is very effective in the sizing of writing paper.

Example V

Blotting paper was treated according to the procedure of Example III with a wet-strength resin, a rosin size, or a polyamine-formaldehyde solution to give loadings of 0.25% on the dry weight of the paper. Water absorption was determined with the following results:

| Treatment | Method of Curing | Grams of Water Absorbed in 5 Minutes by 15 sq. in. Sample |
|---|---|---|
| 0.25% Rosin size | 15 Min. at 105° C | 0.39 |
| 0.25% Polyamine F | 20 Min. at 120° C | 0.30 |
| 0.25% Polyamine G' | do | 0.30 |
| 0.25% Polyamine H | do | 0.26 |
| 0.25% Polyamine I | do | 0.28 |
| 0.25% Polyamine J | 45 Min. at 120° C | 0.26 |
| 0.25% Urea-Formaldehyde Resin | 20 Min. at 120° C | 5.48 |

Polyamine J had a neutral equivalent of 560 and was obtained by the reductive amination of an ethylene/carbon monoxide copolymer having a molecular weight of 1255 and an E/CO ratio of 11.6:1.

Example VI

Samples prepared in the preceding example were tested for strength after soaking in water for various times.

| Treatment | Bursting Strength, lb./sq. in. | | | |
|---|---|---|---|---|
| | Dry | 15 seconds Wet | 20 minutes Wet | 18 hours Wet |
| None (Control) | 44.4 | 0 | 0 | 0 |
| 0.25% Rosin size | 46.4 | 14.9 | 0 | 0 |
| 0.25% Urea-Formaldehyde Resin | 47.0 | 6.4 | 2.5 | 2.0 |
| 0.25% Polyamine F | 45.0 | 24.8 | 9.4 | 7.4 |
| 0.25% Polyamine G' | 43.6 | 25.4 | 10.7 | 5.8 |
| 0.25% Polyamine H | 46.0 | 12.0 | | 6.2 |
| 0.25% Polyamine I | 43.0 | 24.2 | 11.8 | 7.0 |
| 0.25% Polyamine J | 45.0 | 25.0 | 8.0 | 5.2 |

These data show that by virtue of their waterproofing action the polyamine-formaldehyde treatments contribute greatly to the wet-strength of the blotting paper, and on a weight basis are several times as effective as a conventional resin used for improving wet-strength by binding the fibers together. The polyamine-formaldehyde treatments are also superior to the widely used rosin size in maintaining strength of the paper, especially for lengthy exposure to water.

Example VII

A 0.5% solution of polyamine J (Example V) in the form of its acetic acid salt was mixed with formalin to give a formaldehyde concentration of 20% on the weight of the polyamine. Blotting paper was impregnated with this solution to a polyamine loading of 0.5% on the weight of the dry paper. The sheets were cured by air-drying for 5 days. The strength of these sheets was measured wet and dry.

| Treatment | Bursting Strength (lb./sq. in.) | | | | |
|---|---|---|---|---|---|
| | Dry | 15 Seconds Wet | 20 Minutes Wet | 18 Hours Wet | 20 Minutes Wet in 0.2% Wetting Agent |
| 0.5% Polyamine J | 42.2 | 22.2 | 9.2 | 5.0 | 0 |
| None (Control) | 44.4 | 0 | 0 | 0 | 0 |

These results illustrate clearly that a low concentration of the polyamine-formaldehyde product maintains the strength of the treated paper in the presence of water by virtue of its waterproofing rather than binding action. When a strong wetting agent, e. g., an alkyl aryl polyether, was used in the water, the treated paper showed a rapid decrease in wet strength illustrating that the wet strength ordinarily shown by the paper is the result of its waterproofness.

Examples VIII

Blotting paper was impregnated with various loadings of urea-formaldehyde resin and polyamine F (Example I) modified with formaldehyde (20% on the polyamine) by the procedure described previously in Example III. Samples were cured 45 minutes at 120° C. and tested for strength after exposure to water.

| Treatment | Bursting Strength, lb./sq. in. | | | |
|---|---|---|---|---|
| | Dry | 15 Seconds Wet | 20 Minutes Wet | 18 Hours Wet |
| None (Control) | 44.4 | 0 | 0 | 0 |
| 0.5% Urea-Formaldehyde Resin | 33.4 | 7.0 | 4.7 | 4.0 |
| 1% Urea-Formaldehyde Resin | 39.6 | 8.0 | 7.6 | 5.4 |
| 2% Urea-Formaldehyde Resin | 58.8 | 14.2 | 13.6 | 13.2 |
| 4% Urea-Formaldehyde Resin | 63.2 | 19.1 | 18.0 | 17.1 |
| 0.5% Polyamine F | 44.1 | 29.0 | 14.2 | 8.3 |
| 1% Polyamine F | 49.0 | 34.9 | 19.0 | 11.6 |
| 2% Polyamine F | 60.4 | 36.6 | 23.6 | 18.6 |
| 4% Polyamine F | 69.0 | 45.4 | 29.2 | 21.4 |

The excellent performance of the polyamine-formaldehyde treatment at all levels between 0.5 and 4% is illustrated by the figures above.

Example IX

Although the polyamine-formaldehyde treatment at low concentrations functions solely as a waterproofing agent, higher concentrations have a strengthening action on the paper as the result of a binding effect on the fibers. This is illustrated in the previous example by the increase in dry strength of the paper which results as the concentration of the treatment on the paper is increased. This is shown also by the use of a wetting agent, as in Example VII. Sheets were impregnated in the usual manner with polyamines modified with formaldehyde and cured for 45 minutes at 120° C. The bursting strength data for the treated papers are given below:

| Treatment | Bursting Strength, lb./sq. in. | | | |
|---|---|---|---|---|
| | Dry | 20 Minutes Wet | 18 Hours Wet | 20 Minutes Wet in 0.2% Wetting Agent |
| 2.0% Polyamine F | 60.4 | 23.6 | 18.6 | 13.2 |
| 2.0% Polyamine H | 55.4 | 20.4 | 15.8 | 13.4 |
| 2.0% Polyamine I | 57.6 | 24.8 | 17.4 | 15.0 |
| 4.0% Polyamine F | 69.0 | 29.2 | 21.4 | 18.4 |
| 4.0% Polyamine H | 62.6 | 27.4 | 19.8 | 17.6 |
| 4.0% Polyamine I | 63.2 | 27.2 | 20.4 | 18.0 |

At these loadings of polyamine-formaldehyde product, the strength of the paper soaked in 0.2% aqueous solution of an alkyl aryl polyether wetting agent, does not drop to zero, as was the case at a loading of 0.5% (Example VII). The residual strength of the paper soaked in the presence of the wetting agent is probably due entirely to the binding action which the resin has on the fibers.

Example X

A series of polyamines obtained by reduction of diene hydrocarbon/acrylonitrile copolymers were evaluated in waterproofing treatments for paper. One percent solutions of these polyamines in dilute acetic acid were modified with formaldehyde to the extent of 20% on the weight of the polyamine. Blotter paper was impregnated to a polyamine content of 1% dried, and cured by heating for 20 minutes at 105° C. Water resistance and strength of the sheets was determined in the usual way.

| Polyamine | Neutralization Equivalent | Mol. Wt. | Copolymer from which Prepared | Grams of Water Absorbed in 5 Min. by 15 sq. in. Sample | Dry | Bursting Strength, lbs./sq. in. | |
|---|---|---|---|---|---|---|---|
| | | | | | | 20 Minutes Wet | 18 Hours Wet |
| N | 301 | 1,350 | 4:1 butadiene/acrylonitrile | 0.36 | 52 | 12 | 8 |
| O | 369 | 920 | 5:1 butadiene/methacrylonitrile | 0.34 | 54 | 14 | 8 |
| P | 468 | 1,120 | 3:2:1 butadiene/styrene/acrylonitrile | 0.42 | 55 | 11 | 0 |
| R | 177 | 1,095 | 2:1 butadiene/acrylonitrile | 0.37 | 60 | 16 | 12 |

Although in the examples the solutions of the polymeric polyamines have been made by adding the polyamine to an aqueous solution of an acid, preformed salts of the polyamine with an acid can be used for preparing the said solutions. Suitable methods for preparing such salts are those described in the co-pending application of M. E. Cupery, U. S. Serial No. 48,161, filed September 7, 1948.

Suitable acids for preparing either the solutions of the polymeric polyamines or salts thereof are those giving salts which are readily water-soluble. Among these are acetic, propionic, formic, butyric, glycolic, lactic, hydrochloric, and the like.

The amount of polymeric polyamine salt plus formaldehyde deposited on the paper, that is, the pick-up from solution may vary from 0.1 to 10% by weight of the dry paper. Usually the amount deposited on the paper is from 0.25 to 5% by weight of the dry paper.

The curing temperature employed may vary from 90° to 150° C. Usually, however, the treated paper is cured at 100° to 140° C. or dried and cured by room temperature storage.

The time of curing is at least 1 minute at the upper temperature indicated above and at least 15 minutes at the lower indicated temperature. In the preferred operating temperature range of 100° to 140° C. satisfactory curing is obtained in from 2 to 20 minutes and this is therefore the curing time most frequently used.

To the solutions of the polymeric polyamine there may be added modifying ingredients such as pigments, dyes, waxes, etc., to impart special effects or properties to the paper.

Although aqueous formaldehyde has been used in the examples it is to be understood that formaldehyde donors can be used equally as well. Thus, in place of formaldehyde there can be used paraformaldehyde and the like.

The polymeric polyamines used in the practice of this invention can be those obtained from monoolefin/carbon monoxide polymers in accordance with the reductive amination procedure disclosed and claimed in the copending application of H. H. Hoehn, U. S. Serial No. 4,932, filed January 28, 1948, and now Patent No. 2,495,255, January 24, 1950, or they may be those polymeric polyamines obtained by the catalytic hydrogenation of acrylonitrile and alkacrylonitrile polymers, and copolymers of acrylonitrile and alkacrylonitriles with polymerizable vinylidene compounds, i. e., polymerizable vinylidene compounds containing a double bonded methylene group, as described in the copending application of Paul S. Pinkney, Serial No. 51,845, filed September 29, 1948, and now abandoned, of which Serial No. 108,043, filed August 1, 1949, is a continuation-in-part. Examples of such polymerizable vinylidene compounds are ethylene, propylene, butylenes, 2-chloro-1,3-butadiene, isoprene, 1,3-butadiene, piperylene, styrene, methyl vinyl ketone, vinyl acetate, vinyl fluoride, methyl and ethyl acrylates and methacrylates, vinylidene chloride, vinyl cyclohexene, vinyl naphthalene, etc.

The polymeric polyamines derived from monoolefin/carbon monoxide polymers have a main polymer chain consisting solely of carbon atoms and contain a plurality of amino groups, the nitrogen thereof containing at least one hydrogen atom and being attached directly by a single bond to a carbon atom which is an integral part of the main polymer chain. The monoolefin/carbon monoxide polymers reductively aminated are formed by polymerizing a monoolefin containing from two to four carbon atoms, preferably ethylene, with carbon monoxide. The preferred polymeric polyamines of this type have a plurality of units of the formula

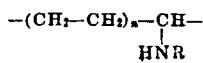

wherein R is hydrogen or a monovalent hydrocarbon radical, preferably of from 1 to 18 carbon atoms, and $n$ is a positive integer of from 3 to 40. These polymeric polyamines, if reductive amination is not complete, may also contain carbonyl carbon in the chain of carbon atoms comprising the main polymer chain.

The polymeric polyamines derived from acrylonitrile and alkacrylonitrile polymers and copolymers contain a linear polymeric hydrocarbon chain to which are attached primary aminomethyl groups. These polymeric polyamines are linear polymers characterized by a plurality of units of the formula

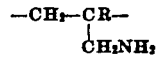

wherein R is hydrogen or an alkyl group of one to six carbons. This unit may be the sole unit in the polymer but is usually associated with unreduced acrylonitrile or alkacrylonitrile units,

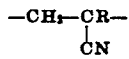

and may also include the polymeric units of any polymerizable vinylidene compound. The radical R in the foregoing formulas is preferably hydrogen or methyl, since acrylonitrile and methacrylonitrile are readily available. The preferred products are polymeric polyamines derived from copolymers of acrylonitrile or alkacrylonitriles with vinylidene hydrocarbons and particularly the copolymers with 1,3-diene hydrocarbons, such as, 1,3-butadiene.

The acrylonitrile polymers and copolymers are well known in the art and they may be prepared by any well known procedure. In general it is desirable that the polymer to be hydrogenated contain at least one nitrile group for each 50 carbon atoms of the linear polymeric chain and it is preferred that the starting material contain at least one nitrile group for each 6 carbon atoms of the linear polymer chain and that the hydrogenation be continued until the resulting polymeric polyamine contains at least one amino group for each 10 carbon atoms in the polymer.

The example which follows illustrates the preparation of a typical polymeric polyamine obtained from monoolefin/carbon monoxide polymers and usefully employable in the practice of this invention.

A stainless steel-lined pressure reactor was charged with 40 parts of an ethylene/carbon monoxide polymer having a molecular weight of 1480 and an ethylene:carbon monoxide mole ratio of 10.4:1, 400 parts of benzene and 40 parts of a nickel-on-kieselguhr catalyst. The vessel was then closed, evacuated and charged with 100 parts of anhydrous ammonia. The reactor was placed in a shaker machine and connected to a source of high pressure hydrogen. Hydrogen was expanded into the reactor and heating and agitation were started. The temperature was raised to 200° C. and the pressure was adjusted to 260 atmospheres. These conditions were maintained for 15 hours. The reactor was then allowed to cool, excess hydrogen and ammonia were bled off, and the mixture of solvent, polymeric polyamine, and catalyst was discharged from the reactor. The reaction mixture was diluted with benzene and filtered to remove the catalyst. Analys's of the solution showed it to contain 25% solids by weight. The product had a neutral equivalent of 525, and contained 82.15% carbon, 12.92% hydrogen, 3.12% nitrogen (Dumas method) and 2.61% primary amino nitrogen (Van Slyke method).

The examples which follow illustrate the preparation of typical polymeric polyamines by the catalytic hydrogenation of acrylonitrile polymers.

A solution of 50 parts of a butadiene/acrylonitrile copolymer containing 5.92% nitrogen, which corresponds to 22.4% acrylonitrile and to a butadiene:acrylonitrile mole ratio of 3.53:1, and having a relative viscosity of 1.076 in benzene (measured at a concentration of 0.5 gram per 100 ml. of benzene at 25° C.) and 67 parts of decahydronaphthalene was heated for 2 hours at 75° C. with 3 parts of a palladium-on-carbon catalyst under 1000 to 2000 lbs./sq. in. pressure of hydrogen. The mixture was filtered to remove the catalyst and heated to 210° C. under 10 mm. pressure to remove the solvent. There was obtained 34 parts of a viscous oil having an iodine number of 128 and containing 0.8% primary amino nitrogen.

Thirty parts of the above partially hydrogenated polymer was dissolved in 90 parts of decahydronaphthalene and this solution, together with 3 parts of alloy skeleton nickel and 50 parts anhydrous ammonia, was placed in an oscillating autoclave and heated at 250° C. for 19 hours under 930 to 950 atm. hydrogen pressure. The reaction mixture was filtered to remove the catalyst and heated at 200° C. under 1 mm. pressure to remove the solvent. There was obtained 22 parts of a highly viscous liquid, soluble in 5% acetic acid. This polymer contained 5.60% nitrogen (total) and 4.09% primary amino nitrogen, indicating that about 73% of the nitrile groups had been reduced to amino-methyl groups. The carbon content was 81% and the hydrogen content 13.03%. The molecular weight was 1100, as determined ebullioscopically in benzene.

A mixture of 30 parts of a styrene/acrylonitrile polymer containing 7.57% nitrogen, which corresponds to an acrylonitrile mole percentage of 44% and a styrene:acrylonitrile mole ratio of 1.27:1, 3 parts of alloy skeleton nickel and 60 parts of anhydrous ammonia was placed in a pressure vessel and heated at 250° C. for 5 hours under 800 to 1000 atm. hydrogen pressure. The reaction product was taken up in hot toluene, in which it was soluble, and filtered to remove the catalyst. Evaporation of the solvent under reduced pressure gave 18 parts of a polymeric polyamine containing 7.26% total nitrogen, 1.83% primary amino nitrogen, 83.63% carbon and 8.37% hydrogen. From these data it may be calculated that the polymer had one primary amino group per 18.8 linear chain carbon atoms.

Forty parts of a butadiene/methacrylonitrile polymer having a molecular weight of 1200 (determined ebullioscopically in benzene at 25° C.), in 160 parts of dioxane, 12 parts of alloy skeleton cobalt catalyst, and 40 parts of anhydrous ammonia were placed in a closed reactor and heated for 15 hours at 250° C. under 900 to 930 atm. hydrogen pressure. Thereafter the reaction mixture was permitted to cool to room temperature, the reactor was then opened and discharged. After filtering off the catalyst and removing the solvent under reduced pressure, there was left 40 parts of a nearly colorless, viscous polymeric amine soluble in 5% acetic acid, neutral equivalent 325, and analyzing 6.18% primary amino nitrogen.

The papers contained in accordance with this invention are useful in the manufacture of paper bags, e. g. fertilizer bags, flooring papers, building paper board, seat cover papers, moisture vapor transmission resistant papers, electrical insulation paper such as that used for cable wrap, wallpaper, writing paper, and the like.

As many apparently widely different embodiments of this invention may be made without departing from the spirit and scope thereof, it is to be understood that this invention is not limited to the specific embodiments thereof except as defined in the appended claims.

I claim:

1. Paper treated with formaldehyde and a polymeric polyamine in solution, said polymeric polyamine having a main polymer chain consisting solely of carbon atoms and containing a plurality of amino groups and being selected from the class consisting of polymeric polyamines in which the amino nitrogen has at least one hydrogen atom and is directly attached by a single bond to a carbon atom of the main polymer chain and polymeric polyamines containing primary amino nitrogen atoms linked directly by a methylene group to a carbon atom of the main polymer chain.

2. Paper treated with formaldehyde and a polymeric polyamine in solution, said polymeric polyamine having a main polymer chain consisting solely of carbon atoms and containing a plurality of amino groups in which the amino nitrogen atom has at least one hydrogen atom and is directly attached by a single bond to a carbon atom which is an integral part of the main polymer chain.

3. Paper treated with formaldehyde and a polymeric polyamine in solution, said polymeric polyamine being the reductive-amination product of a polymer of a monoolefin containing from 2 to 4 carbon atoms with carbon monoxide and said polymeric polyamine having a main polymer chain consisting solely of carbon atoms and containing a plurality of amino groups in which the amino nitrogen atom has at least one hydrogen atom and is directly attached by a single bond to a carbon atom which is an integral part of the main polymer chain.

4. Paper treated with formaldehyde and a polymeric polyamine in solution, said polymeric polyamine being the reductive-amination product of a polymer of ethylene with carbon monoxide and said polymeric polyamine having a main polymer chain consisting solely of carbon atoms and containing a plurality of amino groups in which the amino nitrogen atom has at least one hydrogen atom and is directly attached by a single bond to a carbon atom which is an integral part of the main polymer chain.

5. Paper treated with formaldehyde and a polymeric polyamine in solution, said polymeric polyamine having a main polymer chain consisting solely of carbon atoms and containing a plurality of primary amino groups with the amino nitrogen thereof linked directly by a methylene group to a carbon atom of the main polymer chain.

MARTIN E. CUPERY.

REFERENCES CITED

The following references are of record in the file of this patent:

UNITED STATES PATENTS

| Number | Name | Date |
|---|---|---|
| 2,456,428 | Parker | Dec. 14, 1948 |